United States Patent
Hsieh et al.

(10) Patent No.: US 10,769,550 B2
(45) Date of Patent: Sep. 8, 2020

(54) ENSEMBLE LEARNING PREDICTION APPARATUS AND METHOD, AND NON-TRANSITORY COMPUTER-READABLE STORAGE MEDIUM

(71) Applicant: INDUSTRIAL TECHNOLOGY RESEARCH INSTITUTE, Hsinchu (TW)

(72) Inventors: Hsin-Lung Hsieh, Kaohsiung (TW); Chuang-Hua Chueh, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 851 days.

(21) Appl. No.: 15/392,377

(22) Filed: Dec. 28, 2016

(65) Prior Publication Data
US 2018/0137427 A1    May 17, 2018

(30) Foreign Application Priority Data
Nov. 17, 2016 (TW) .............................. 105137644 A (51) Int. Cl.
*G06N 20/00*      (2019.01)
*G06F 16/28*      (2019.01)
(Continued)

(52) U.S. Cl.
CPC ........... *G06N 20/00* (2019.01); *G06F 16/285* (2019.01); *G06F 16/35* (2019.01); *G06K 9/6228* (2013.01); *G06K 9/6256* (2013.01); *G06K 9/6262* (2013.01)

(58) Field of Classification Search
CPC ........ G06N 20/00; G06N 20/10; G06N 20/20; G06K 9/6228; G06K 9/6256; G06K 9/6262; G06F 16/285; G06F 16/35
(Continued)

(56) References Cited

U.S. PATENT DOCUMENTS 7,280,987 B2 * 10/2007 Chen ...................... G06N 3/086
706/15
7,698,235 B2   4/2010 Kuroiwa
(Continued)

FOREIGN PATENT DOCUMENTS

| CN | 101231297 A | 7/2008 |
| TW | 200928843 A | 7/2009 |
| TW | I472887 B   | 2/2015 |

OTHER PUBLICATIONS

Opitz DW, Shavlik JW. "Generating accurate and diverse members of a neural-network ensemble." In Advances in neural information processing systems 1996 (pp. 535-541). (Year: 1996).*

(Continued)

*Primary Examiner* — Shane D Woolwine
(74) *Attorney, Agent, or Firm* — Muncy, Geissler, Olds & Lowe, P.C.

(57) ABSTRACT

The disclosure is directed to an ensemble learning prediction apparatus. The apparatus includes a loss module, a diversity module, a sample weight module, and an integrating weight module. The loss module, the diversity module and the sample weight module calculate a loss, a diversity and a sample weight, respectively. An ensemble weight is learned by an object function built by the loss, diversity and the sample weight. The integrating weight module calculates an adaptive ensemble weight by integrating the ensemble weight and previous ensemble weights at a plurality of previous time points.

25 Claims, 5 Drawing Sheets

(51) Int. Cl.
*G06F 16/35* (2019.01)
*G06K 9/62* (2006.01)

(58) Field of Classification Search
USPC .......................................................... 706/12
See application file for complete search history.

(56) References Cited

U.S. PATENT DOCUMENTS

| | | | |
|---|---|---|---|
| 8,065,244 | B2 | 11/2011 | Chen et al. |
| 8,582,871 | B2 | 11/2013 | Skipper et al. |
| 2004/0093315 | A1 | 5/2004 | Carney |
| 2006/0112039 | A1 | 5/2006 | Wang |
| 2017/0132528 | A1* | 5/2017 | Aslan ..................... G06N 20/00 |

OTHER PUBLICATIONS

Street WN, Kim Y. "A streaming ensemble algorithm (SEA) for large-scale classification." In Proceedings of the seventh ACM SIGKDD international conference on Knowledge discovery and data mining Aug. 26, 2001 (pp. 377-382). ACM. (Year: 2001).*

Ranganathan A. "The levenberg-marquardt algorithm." Tutorial on LM algorithm. Jun. 8, 2004;11(1):101-10. (Year: 2004).*

Kolter JZ, Maloof MA. "Using additive expert ensembles to cope with concept drift." In Proceedings of the 22nd international conference on Machine learning Aug. 7, 2005 (pp. 449-456). ACM. (Year: 2005).*

Bi Y. "The impact of diversity on the accuracy of evidential classifier ensembles." International Journal of Approximate Reasoning. Jun. 1, 2012;53(4):584-607. (Year: 2012).*

Hyunjoong Kim et al; "A weight-adjusted voting algorithm for ensembles of classifiers" Journal of the Korean Statistical Society; 40 (2011); 437-449.

Alexey Tsymbal et al "Dynamic Integration of Classifiers for Handling Concept Drift"; Information Fusion; 2008; 56-68.

Haixun Wang et al; "Mining ConceptDrifting Data Streams using Ensemble Classifiers";ACM SIGKDD International Conference on knowledge Discovery and Data Mininning; 2014; 226-235.

Chun Yang et al "Diversity-Based Ensemble with Sample Weight Learning"; International Conference on Pattern Recognition; 2014, 1236-1241.

Lin Li et al; "Diagnosis of diabetes using a weight-adjusted voting approach." IEEE International Conference on Bioinformatics and Bioengineering,2014; pp. 320-324.

W.N. Street et al; "A streaming ensemble algorithm (SEA) for large-scale classification." In Seventh ACM SIGKDD International Conference on Knowledge Discovery and Data Mining (KDD-01), pp. 377-382, 2001.

* cited by examiner

WAV: [1][B,D], DVS: [3][D], DV: [3][D], DS: [3][D], AWV: [2][D], SD: [4][B,C,D], TDD: [5][A,B,C,D]  Note: [ ] literatures.
Baseline: AWV[2] and un-adapted ensemble weight (error rate: 15.18)
A: Adaptive ensemble weight, B: Sample weight, C:Diversity, D: Loss function Influence of sample weight and loss function

[1]: H. Kim, H. Kim, H. Moon, and H. Ahn, " A weight-adjusted voting algorithm for ensembles of classifiers", Journal of the Korean Statistical Society, vol. 40, pp. 437–449, 2011.
[2]: H. Wang, W. Fan, P. S. Yu, and J. Han. "Mining concept-drifting data streams using ensemble classifiers", International Conference on Knowledge Discovery and Data Mining, pages 226–235, 2003.
[3]: A. Tsymbal, M. Pechenizkiy, P. Cunningham, S. Puuronen, "Dynamic integration of classifiers for handling concept drift", Information Fusion vol. 9, pp. 56–68, 2008.
[4]: Chun Yang, Xu-Cheng Yin and Hong-Wei Hao, "Diversity-Based Ensemble with Sample Weight Learning" International Conference on Pattern Recognition, pp.1236-1241, 2014
[5]: present invention

Sample weight

Exemplary embodiment   Binary classification

$$u(x_n^{(t)}) = s(d_c(x_n^{(t)}))(1-s(d_c(x_n^{(t)}))), \quad s(b) = \frac{1}{1+e^{-b}}$$

$$d_c(x_n^{(t)}) = -\varphi_c(x_n^{(t)}) + \varphi_{-c}(x_n^{(t)}) \text{ Misclassification measurement}$$

$$\varphi_c(x_n^{(t)}) = \frac{\exp(z_c^T w)}{\sum_{j=1}^{C} \exp(z_j^T w)}$$

$$\varphi_{-c}(x_n^{(t)}) = \max \frac{\exp(z_{-c}^T w)}{\sum_{j=1}^{C} \exp(z_j^T w)}$$

where $-c = \{1, 2, \ldots, c-1, c+1, \ldots, C\}$

Bilateral decreasing function

| | Combination weight | $x_1$ Prediction result | $x_2$ Prediction result | $x_3$ Prediction result |
|---|---|---|---|---|
| h1 | 0.3 | ✓ | ✓ | × |
| h2 | 0.25 | ✓ | ✓ | × |
| h3 | 0.45 | × | ✓ | × |

✓: Correct prediction
×: Erroneous prediction $$x_1 : d_c(x_1^{(t)}) = \frac{-\exp(0.3+0.25) + \exp(0.45)}{\exp(1)} = -0.06 \Rightarrow u(x_1^{(t)}) = \left(\frac{1}{1+e^{0.06}}\right)\left(1-\left(\frac{1}{1+e^{0.06}}\right)\right) = 0.2497$$

$$x_2 : d_c(x_2^{(t)}) = -\exp(0.3+0.25+0.45)/\exp(1) = -1 \Rightarrow u(x_2^{(t)}) = \left(\frac{1}{1+e^{1}}\right)\left(1-\left(\frac{1}{1+e^{1}}\right)\right) = 0.196$$

$$x_3 : d_c(x_3^{(t)}) = \exp(0.3+0.25+0.45)/\exp(1) = 1 \Rightarrow u(x_3^{(t)}) = \left(\frac{1}{1+e^{-1}}\right)\left(1-\left(\frac{1}{1+e^{-1}}\right)\right) = 0.196$$

FIG. 4 adaptive ensemble weight

- Exemplary embodiment
  - Adaptive ensemble weight corresponding t=1, 2, 3

$w^{(t=0)} = [0.3, 0.25, 0.45]^T$, $w^{(t=1)} = [0.25, 0.25, 0.5]^T$, $w^{(t=2)} = [0.35, 0.30, 0.35]^T$

- Weight decay parameter $\alpha = 0.8$ $w^{(t=3)} = 0.8 \cdot w^{(t=2)} + (0.8)(1-0.8) \cdot w^{(t=1)} + (1-0.8)^2 \cdot w^{(t=0)}$ $= \underline{0.8 \cdot w^{(t=2)} + 0.16 \cdot w^{(t=1)} + 0.04 \cdot w^{(t=0)}}$  Time decay ensemble weight $= [0.294, 0.252, 0.454]^T$

FIG. 5

ENSEMBLE LEARNING PREDICTION APPARATUS AND METHOD, AND NON-TRANSITORY COMPUTER-READABLE STORAGE MEDIUM

This application claims the benefit of Taiwan application Serial No. 105137644, filed Nov. 17, 2016, the disclosure of which is incorporated by reference herein in its entirety.

TECHNICAL FIELD

The disclosure relates in general to an ensemble learning prediction apparatus, an ensemble learning prediction method, and a non-transitory computer-readable storage medium.

BACKGROUND

Prediction is crucial to the manufacturing industries and other industries as well, and is an important part in the analysis of mega data. Future events can be predicted through the analysis of historical data. Of the many prediction methods available in existing literature, the ensemble learning method is one of the supervised learning methods of the machine learning methods. According to the ensemble learning method, a result is obtained by integrating various prediction methods (that is, basic hypotheses) through a combination of weights. Normally, the result obtained by the ensemble learning method is more accurate than the result obtained by one single prediction method. However, in practical application, as the environment varies with the time, concept drifting phenomenon may occur, and the accuracy of the ensemble learning model created according to historical data will decrease. Under such circumstances, the prediction model must be re-trained or adjusted by use of newly created data to restore the prediction accuracy within a short period of time, lest the manufacturing cost or risk might increase due to the drip in prediction accuracy.

According to the prior art, the sample weight is positively proportional to the number of erroneous predictions generated under basic hypotheses, and a larger sample weight is assigned to the sample data generating erroneous predictions under more basic hypotheses. When the sample weight is assigned in this way, these samples are overemphasized, and the influences of other correctable sample data are sacrificed.

SUMMARY

The disclosure is directed to an ensemble learning prediction apparatus and method, and a non-transitory computer-readable storage medium.

According to one embodiment, an ensemble learning prediction apparatus is provided. The apparatus comprises a loss module receiving a sample data and calculating a loss according to a first prediction result of the sample data and an actual result; a diversity module receiving the sample data and calculating a diversity between at least one hypothesis according to a second prediction result of the sample data under the at least one hypothesis; a sample weighting module calculating a correctable value of the sample data according to the first prediction result and the actual result and assigning a sample weight according to the correctable value; and an integrating weighting module, interconnected with the loss module, the diversity module and the sample weighting module, creating an object function according to the loss, the diversity and the sample weight, and training an ensemble weight by use of the object function. An adaptive ensemble weight is calculated by integrating the ensemble weight and the ensemble weights obtained at previous time points.

According to another embodiment, an ensemble learning method is provided. The method includes following steps: calculating a loss according to a first prediction result and an actual result of a sample data; calculating a diversity between at least one hypothesis according to a second prediction result of the sample data under the at least one hypothesis; calculating a correctable value of the sample data according to the first prediction result and the actual result, and assigning a sample weight according to the correctable value; and creating an object function according to the loss, the diversity and the sample weight, and training an ensemble weight by use of the object function. An adaptive ensemble weight is calculated by integrating the ensemble weight and the ensemble weight obtained at previous time points.

The non-transitory computer-readable storage medium provided in the present disclosure can execute the above-mentioned method.

The above and other aspects of the present disclosure will become better understood with regard to the following detailed description of the preferred but non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A number of exemplary embodiments are disclosed below with detailed descriptions and accompanying drawings. For identical or similar elements used in the drawings, the same designations and descriptions are used.

The present disclosure combines the four factors that need to be adjusted when assigning the ensemble weight during the ensemble learning prediction. The four factors are loss function, sample correct ability, model diversity and time evolution. The loss function is used for measuring the difference between a prediction result and a target class (that is, a standard answer or an actual result). Different sample weight is assigned to each sample data according to the sample correct ability. To avoid the online learning sample data being over-trained and losing the required diversity between the basic hypotheses of the ensemble learning model, the diversity of hypotheses is considered during the learning process. Lastly, the weights which decrease as the time distance increases are assigned, such that an optimum ensemble combination weight can be found for each basic classifier during the ensemble learning process, and the concept drifting problem can be resolved to increase prediction accuracy and stability.

The sample correct ability of the present disclosure is used for setting the sample weights and enhancing the samples having greater influence on prediction, such that the accuracy of the prediction result can be significantly increased. The setting of the sample weights is based on following grounds. Under several basic hypotheses, if a particular sample data generates erroneous predictions under too many basic hypotheses (for example, this particular sample data is very hard to predict) or generates correct predictions under too many basic hypotheses (for example, this particular sample data is very easy to predict), this indicates that this particular sample data has a smaller correct ability, and a relatively smaller sample weight is assigned to this particular sample data. If this particular sample data is neither too easy nor too difficult to predict, this indicates that this particular sample data has a larger correct ability, and a relatively larger sample weight is assigned to this particular sample data. Refer to the comparison diagram of error reduction rate illustrated in FIG. 1. The experiment shows that the error reduction rate of the method of the present disclosure can be above 5%.

Figure 1:
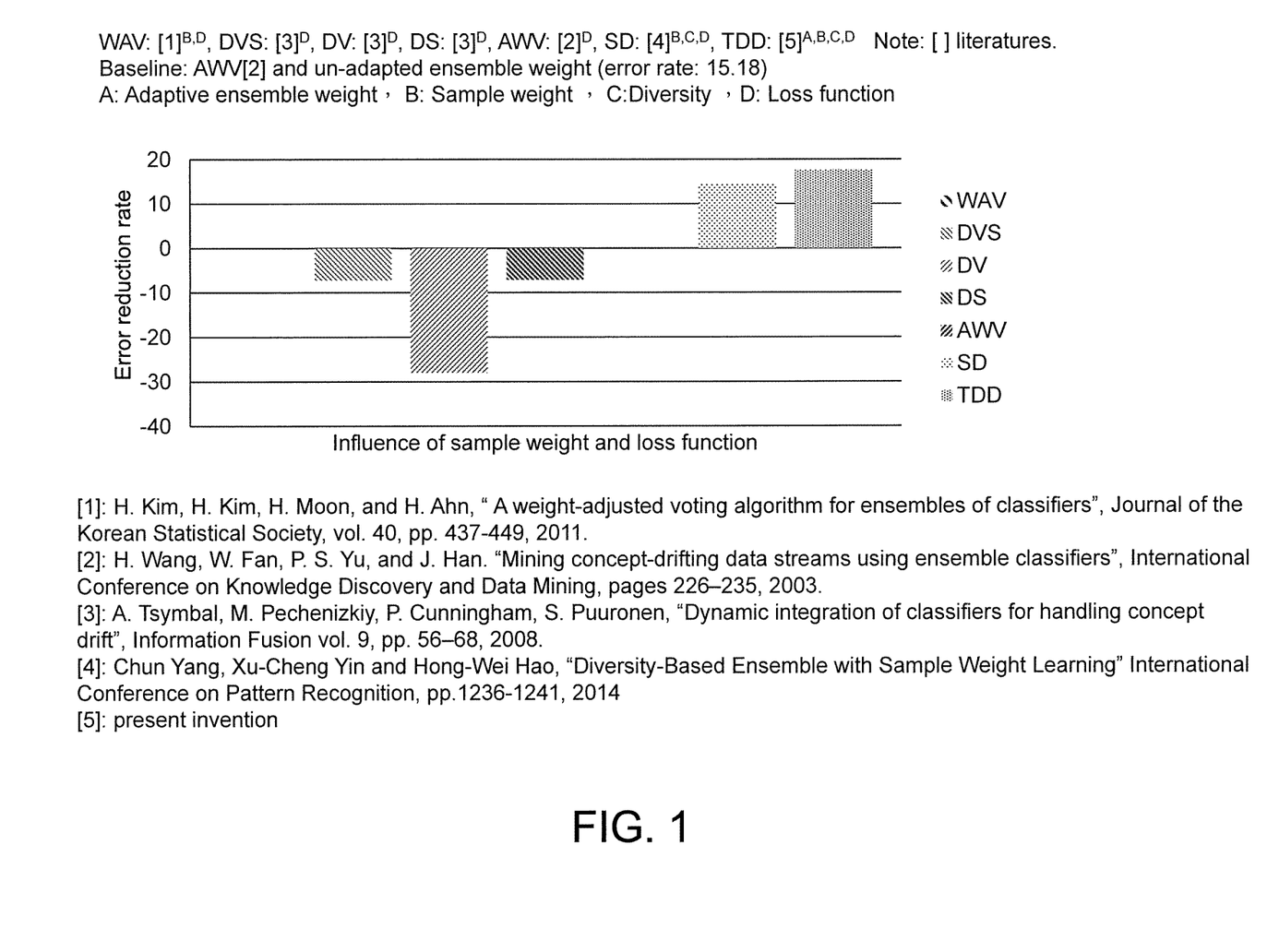
FIG. 1 illustrates a comparison diagram of error reduction rate between the present disclosure and the prior art.

As indicated in FIG. 1, an ensemble weight is obtained by training the experimental data obtained from the SEA data of literature [1] under four hypotheses, namely, Naïve Bayes, Neural network, SVM-RBF kernel and SVM-polynomial kernel, using the training method of the present disclosure. The un-adapted ensemble weight of literature [2] under various hypotheses is used as a basis of comparison against various methods which are evaluated according to the error reduction rate. The experimental results are illustrated in FIG. 1.

Wherein, literature [1] is: W. N. Street and Y. Kim, "A streaming ensemble algorithm (SEA) for large-scale classification", the International Conference on Knowledge Discovery and Data Mining, pp. 377-382, 2001; literature [2] is: H. Wang, W. Fan, P. S. Yu and J. Han, "Mining concept-drifting data streams using ensemble classifiers", International Conference on Knowledge Discovery and Data Mining, pp. 226-235, 2003.

Figure 2:
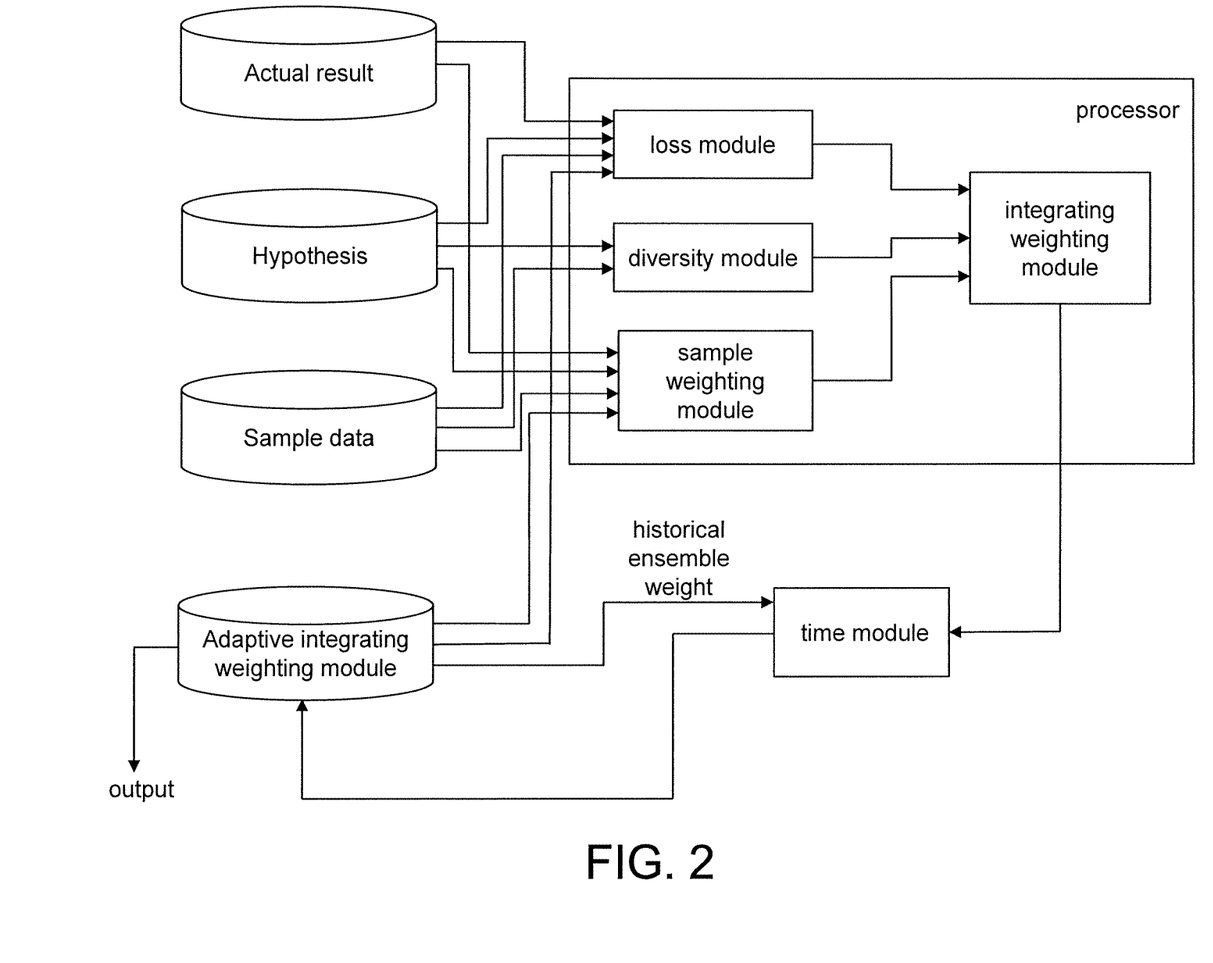
FIG. 2 illustrates an architectural diagram of an ensemble learning prediction apparatus according to the present disclosure.

The ensemble learning prediction apparatus of the present disclosure obtains an adaptive ensemble weight by adjusting the ensemble weight by use of historical ensemble weights. The adaptive ensemble weight is stored in a data medium. The adaptive ensemble weight can be adapted to the current environment to resolve the concept drifting problem. The architecture of the ensemble learning prediction apparatus is illustrated in FIG. 2. The sample weighting module of the ensemble learning prediction apparatus of the present disclosure can be described by use of an object function. The integrating weighting module, the loss module, the diversity module and the sample weighting module are interconnected. An object function is created according to the loss, the diversity and the sample weight, and an ensemble weight is trained by use of the object function. The object function is obtained by integrating the loss function, the diversity and the sample weight. A product is obtained by multiplying the loss obtained by the loss module by the correctable value obtained by the sample weighting module for each sample of the sample data, a sum is obtained by summing up the products for all samples of the sample data, another product is obtained by multiplying the diversity obtained by the diversity module by a regularization parameter, and the ensemble weight obtained via the object function is obtained by subtracting the another product by the sum. The object function of the present disclosure can be expressed as formula (1). Wherein, K×1 vector w denotes an ensemble weight of the ensemble learning prediction; K denotes the number of basic hypotheses (referred as hypotheses hereinafter); $\{x_n^{(t)}\}$, n=1,2, ... N denotes an online learning sample data in the t-th block; N denotes the number of all sample data in the t-th block; $y_n^{(t)}$ denotes a C×1 (1-of-C) binary vector of the labels (that is, classes) of the corresponding online learning sample data $x_n^{(t)}$ and is an actual result of the sample data; C denotes the number of all classes. Here, classes refer to the types of actual results. When $x_n^{(t)}$ corresponds to label j, the value of the j-th element of $y_n^{(t)}$ is 1, and the values of all other elements are 0. For example, $$y_n^{(t)} = \begin{bmatrix} 0 \\ 1 \\ 0 \\ 0 \end{bmatrix}.$$

Wherein, $u(x_n^{(t)})$ denotes a sample weight assigned according to the correct ability of the online learning sample data; $g(\cdot)$ denotes a loss function used for measuring the difference between a prediction result and a target class (an actual result). The loss function is multiplied by the sample weight of each online learning sample data $x_n^{(t)}$ to reflect the importance of the online learning sample data $x_n^{(t)}$ to the loss function. To avoid the online learning sample data being over-trained and losing the required model diversity between the hypothesis models of the ensemble learning prediction system, the object function of the ensemble weight of the ensemble learning prediction further considers the diversity between the hypothesis models, that is, the second item of formula (1). Wherein, D denotes a k×k matrix; the i-th and the j-th elements denote the diversity between the i-th and the j-th hypotheses; λ denotes a regularization parameter, which controls the degree of importance of the diversity between the hypothesis models. The ensemble combination weight $w^{(t+1)}$ can be obtained according to the minimization formula (1).

$$w^{(t+1)} = \operatorname*{argmin}_{w} \sum_{n=1}^{N} u(x_n^{(t)}) g(y_n^{(t)}, w, x_n^{(t)}) - \frac{\lambda}{2} w^T D^{(t)} w \qquad (1)$$

The loss module of the present disclosure can be expressed by use of a loss function. The loss function is used for measuring the difference between a first prediction result and a target class during the learning process. That is, the difference between actual results, and such difference is referred as loss. For example, in the classification problem, the difference can be measured by using a cross-entropy method. The measuring method is not limited to the cross-entropy method. For example, the difference can be measured by a function capable of measuring the difference between the prediction value and the actual value such as by a least square method.

$$g(y_n^{(t)}, w, x_n^{(t)}) = -\sum_{c=1}^{C} y_{nc}^{(t)} \ln \phi_c(x_n^{(t)}) \quad (2)$$

$$\phi_c(x_n^{(t)}) = \frac{\exp(z_c^T w)}{\sum_{j=1}^{C} \exp(z_j^T w)} \quad (3)$$

Formula (2), the loss function describes the difference between the first prediction result and the target class under the current parameter during the learning process. Therefore, the object of the present disclosure is to minimize formula (2) to obtain the parameter w. Formula (3) denotes a posterior probability of the prediction result. Wherein, k×1 vector $z_c$ denotes a c-th row vector of the matrix $\hat{Y}_n^{(t)}$. Since $\hat{y}_{nk}^{(t)}$ of $\hat{Y}_n^{(t)} = [\hat{y}_{n1}^{(t)}, \hat{y}_{n2}^{(t)}, \ldots, \hat{y}_{nk}^{(t)}]$ denotes a C×1 binary vector of the corresponding online learning sample data $x_n^{(t)}$ under the k-th basic hypothesis, $\hat{Y}_n^{(t)}$ is a C×K matrix, which denotes the first prediction result of the n-th sample data under all basic hypotheses.

Each ensemble learning prediction system includes various prediction methods (that is, basic hypotheses), and the diversity can measure the complementarity between two basic hypotheses (referred as hypotheses hereinafter). The calculation of the diversity module can be obtained according to a contingency table. Let the binary classification be taken for example. The prediction results obtained under hypothesis i and hypothesis j are shown in the contingency table. The analysis of diversity is not limited to binary classification, and can also be used in multi-class classification.

|  | $h_i = +1$ | $h_i = -1$ |
|---|---|---|
| $h_j = +1$ | a | c |
| $h_j = -1$ | b | d |

The diversity between hypothesis i and hypothesis j can be expressed as:

$$D_{ij} = \frac{b+c}{m}, \text{ wherein } m = a+b+c+d \quad (4)$$

Wherein, the larger the $D_{ij}$, the more diversified the two basic hypotheses.

The diversity is exemplified below by use of a binary classification problem (+1,−1), wherein the hypothesis model (h1,h2) is expresses below, and the values of a, b, c and d are obtained according to a second prediction a = 2, b = 2, c = 0, d = 1 result: $D_{12} = \frac{b+c}{m} = \frac{2}{5}$

The hypothesis model (h1,h3) is expressed below:

a = 3, b = 1, c = 0, d = 1

$$D_{13} = \frac{b+c}{m} = \frac{1}{5}$$

Since $D_{12} = 2/5$ is larger than $D_{13} = 1/5$, the diversity of the hypothesis model (h1,h2) is larger than that of the hypothesis model (h1,h3).

The sample weighting module of the present disclosure is completed by use of sample correct ability which can be used in following scenarios. If a particular sample data always generates erroneous predictions under too many basic hypotheses (for example, this particular sample data is very hard to predict) or always generates correct predictions under too many basic hypotheses (for example, this particular sample data is very easy to predict), or the difference between the target class and an erroneous class (that is, an erroneous result) is too large or too small, then a relatively smaller sample weight is assigned to this particular sample data. If this particular sample data is neither too easy nor too difficult to predict, a larger sample weight is assigned to this particular sample data as indicated in the schematic diagram of sample weight correction of FIG. 3. Each sample of the sample data has a different sample weight.

Figure 3:
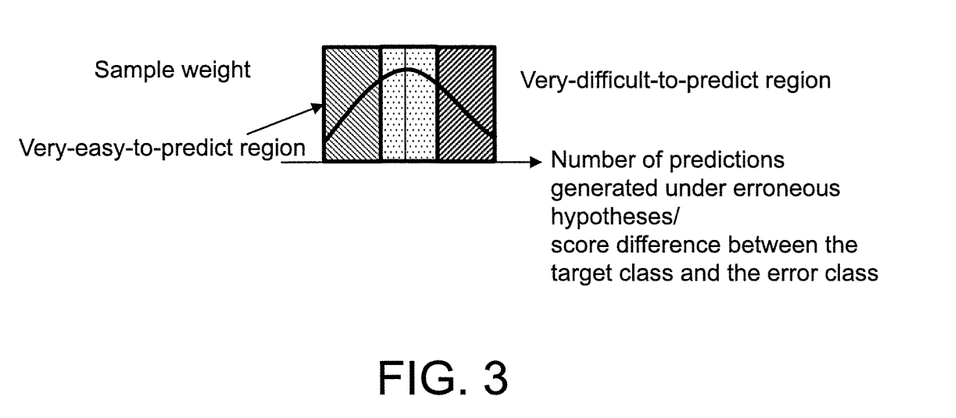
FIG. 3 illustrates a schematic diagram of sample weight correction according to the present disclosure.

Based on the above concepts, the present disclosure defines a function, such as formula (5), to describe the sample weight and avoid a large sample weight being assigned to the sample data that is hard to predict, lest the sample data might be overemphasized and the influence of other correctable sample data might be sacrificed. A long as the sample weight can be corrected as indicated in FIG. 3, the present disclosure does not restrict the correction to be done through the use of formula (5). The designation $d_c(x_n^{(t)})$ of formula (5), which defines the difference between the target class c and the erroneous class, is expressed as formula (7).

$$u(x_n^{(t)}) = s(d_c(x_n^{(t)}))(1 - s(d_c(x_n^{(t)}))) \quad (5)$$

$$s(b) = \frac{1}{1 + e^{-b}} \quad (6)$$

$$d_c(x_n^{(t)}) = -\phi_c(x_n^{(t)}) + \phi_{-c}(x_n^{(t)}) \quad (7)$$

Wherein $$\phi_{-c}: \max \frac{\exp(z_c^T w)}{\sum_{j=1}^{C} \exp(z_j^T w)}, \quad (8)$$

where $-c = \{1, 2, \ldots, c-1, c+1, \ldots, C\}$

The sample weight of the sample $x_n^{(t)}$ can be obtained according to formula (5), which can be expressed as a function. The function assigns smaller sample weights to the sample data easy or hard to predict and assigns larger sample weights to other sample data. The function has a high point from which the function descends to both sides on which the high point no more appears. The function can be a bilateral decreasing function, a quadratic function having a high point, a polynomial function having a high point, or any combination thereof. When at least one prediction of some of the sample data generated under the most of the at least one hypothesis is totally correct or erroneous, the correctable value which is small is provided; for other sample data, the correctable value which is large is provided.

Figure 4:
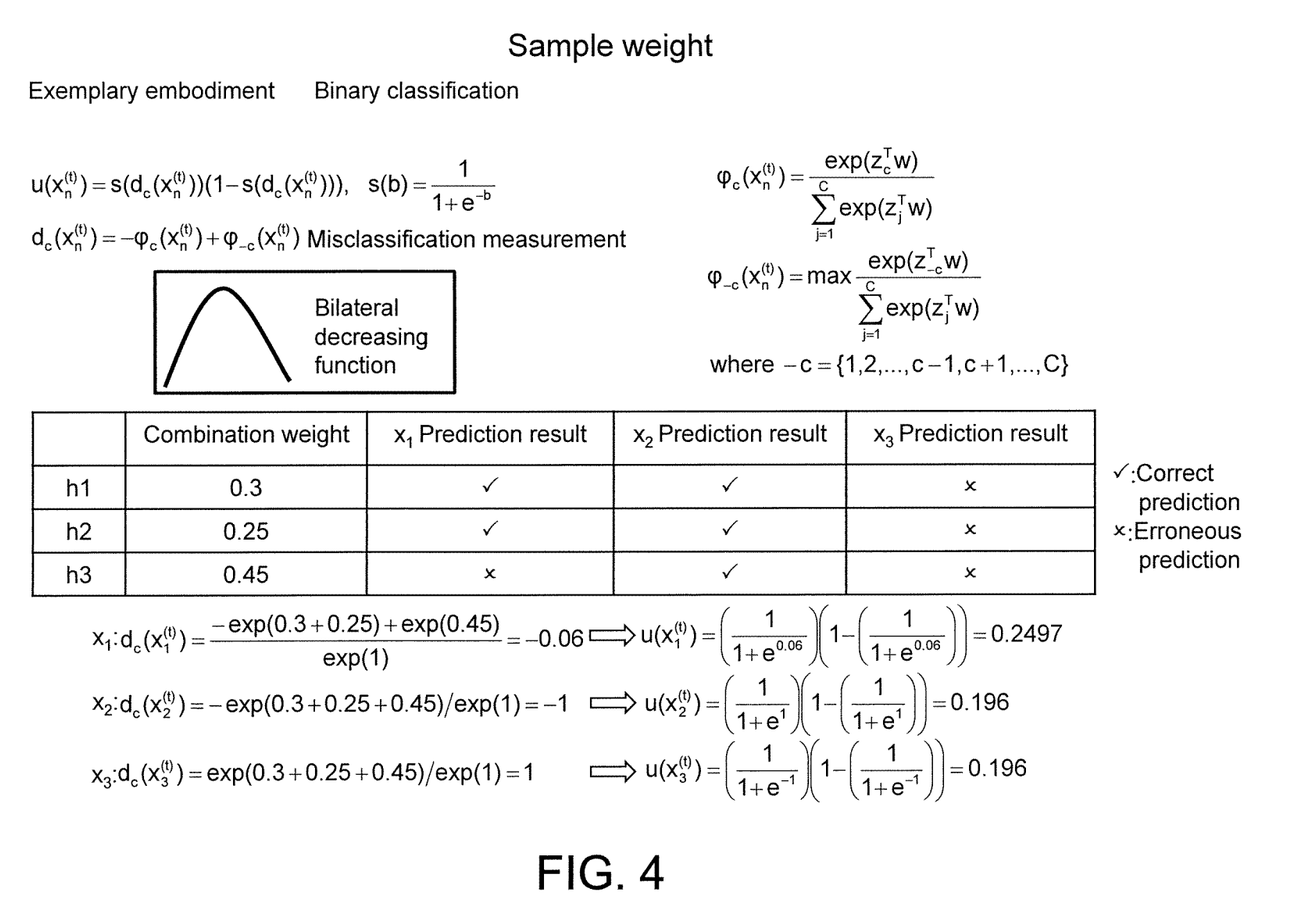
FIG. 4 illustrates a schematic diagram of sample weight correction exemplified by a binary classifier according to the present disclosure.

Refer to FIG. 4, which is exemplified by a binary classifier. Based on the concept of FIG. 2, the sample weights are obtained and illustrated at the bottom right of FIG. 4.

Figure 5:
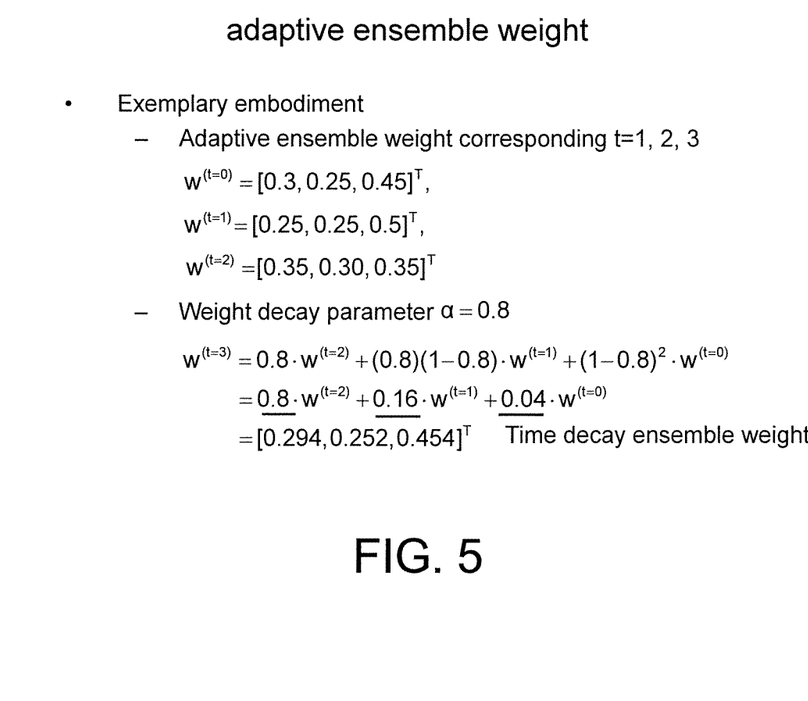
FIG. 5 illustrates an example of an adaptive weight according to the present disclosure.

Since the environment varies with the time, the adaptive ensemble weight is suitably assigned in response to the ensemble learning prediction to resolve the concept drifting problem. In the present disclosure, the ensemble weight is assigned according to the time distance. Since the sample data observed at a previous time point closer to a current time point is more closely related with the sample data observed at the current time point, and the corresponding ensemble weight of the sample data observed at a previous time point closer to the current time point has stronger relationship with the ensemble weight of the sample data observed at the current time point, a larger ensemble weight is assigned to the sample data observed at a previous time point closer to the current time point. Conversely, since the sample data observed at a previous time point farther away from the current time point is less closely related with the sample data observed at the current time point, a smaller ensemble weight is assigned to the sample data observed at a previous time point far away from the current time point. That is, since most data are time related, and the closer to the current time point, the more important the sample data, the prediction model integrates historical sample data. Lastly, an optimum ensemble combination weight of the current ensemble learning prediction can be obtained by integrating the ensemble weights of the ensemble learning predictions estimated at previous time points. According to the decreasing function, a larger weight is assigned to the sample data observed at a time point closer to the current time point, and a smaller weight is assigned to the sample data observed at a time point farther away from the current time point. Such relationship can be expressed as formula (9):

$$\tilde{w}^{(t)} = \alpha w^{(t)} + (1-\alpha)\tilde{w}^{(t-1)} \quad (9)$$
$$= \alpha w^{(t)} + \alpha(1-\alpha)w^{(t-1)} + (1-\alpha)^2 \tilde{w}^{(t-2)}$$
$$= \alpha[w^{(t)} + (1-\alpha)w^{(t-1)} + (1-\alpha)^2 w^{(t-2)} +$$
$$(1-\alpha)^3 w^{(t-3)} + \ldots (1-\alpha)^{t-1} w^{(1)}] + (1-\alpha)^t w^{(0)}$$

Wherein $0 \leq \alpha \leq 1$. FIG. 5 illustrates an example of an adaptive weight according to the present disclosure. As indicated in FIG. 5, the time decay ensemble weight decreases as the time distance increases, but increases as the time distance decreases. The adaptive ensemble weight is calculated by integrating the ensemble weight and a plurality of previous ensemble weights obtained at previous time points.

The optimum ensemble combination weight $w^{(t+1)}$ can be obtained according to the minimization formula (1). The ensemble learning prediction at the next time point t+1 is expressed as formula (10):

$$w^{(t+1)} = -\sum_{n=1}^{N}\sum_{c=1}^{C} y_{nc}^{(t)} u(x_n^{(t)}) \left[ z_c - \sum_{j=1}^{C} \left( \frac{\exp(z_j^T w)}{\sum_{l=1}^{C} \exp(z_l^T w)} \right) z_j \right] - \lambda D^{(t)} w \quad (10)$$

In some embodiments, the non-transitory computer-readable storage medium can be stored in a computer program product having instructions allocated to a computing device executing the abovementioned method.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An ensemble learning prediction apparatus, comprising:
 a loss module receiving a sample data and calculating a loss according to a first prediction result of the sample data and an actual result;
 a diversity module receiving the sample data and calculating a diversity between at least one hypothesis according to a second prediction result of the sample data under the at least one hypothesis;
 a sample weighting module calculating a correctable value of the sample data according to the first prediction result and the actual result and assigning a sample weight according to the correctable value; and
 an integrating weighting module, interconnected with the loss module, the diversity module and the sample weighting module, creating an object function according to the loss, the diversity and the sample weight, and training an ensemble weight by use of the object function;
 wherein an adaptive ensemble weight is calculated by integrating the ensemble weight and the ensemble weight obtained at previous time points, and the correctable value is obtained according to a function having a high point from which the function descends to both sides on which the high point no more appears.

2. The apparatus according to claim 1, wherein the correctable value is obtained according to a difference between a target class and an erroneous class of the sample data.

3. The apparatus according to claim 1, wherein the function is a bilateral decreasing function, a quadratic function having a high point, a polynomial function having a high point, or a combination thereof.

4. The apparatus according to claim 1, wherein when at least one prediction of some of the sample data generated under the most of the at least one hypothesis is totally correct or erroneous, the correctable value which is small is provided; for other sample data, the correctable value which is large is provided.

5. The apparatus according to claim 1, wherein a product is obtained by multiplying the loss obtained by the loss module by the correctable value obtained by the sample weighting module for each sample of the sample data, a sum is obtained by summing up the products for all samples of the sample data, another product is obtained by multiplying the diversity obtained by the diversity module by a regularization parameter, and the ensemble weight obtained via the object function is obtained by subtracting the another product by the sum.

6. The apparatus according to claim 1, wherein the correctable value is calculated according to the sample weight and the first prediction result of the sample data observed at a previous time point and the actual result.

7. The apparatus according to claim 1, wherein for the adaptive ensemble weight, a larger weight is assigned to the sample data observed at a time point closer to a current time point and a smaller weight is assigned to the sample data observed at a time point farther away from the current time point.

8. The apparatus according to claim 1, wherein the adaptive ensemble weight is stored in a data medium.

9. The apparatus according to claim 1, wherein the diversity is calculated from a contingency table.

10. The apparatus according to claim 9, wherein the contingency table has binary classification.

11. The apparatus according to claim 9, wherein the contingency table has multi-class classification.

12. The apparatus according to claim 1, wherein the sample weight of each sample of the sample data is different.

13. An ensemble learning method, comprising:
calculating a loss according to a first prediction result and an actual result of a sample data;
calculating a diversity between at least one hypothesis according to a second prediction result of the sample data under the at least one hypothesis;
calculating a correctable value of the sample data according to the first prediction result and the actual result, and assigning a sample weight according to the correctable value; and
creating an object function according to the loss, the diversity and the sample weight, and training an ensemble weight by use of the object function;
wherein an adaptive ensemble weight is calculated by integrating the ensemble weight and the ensemble weight obtained at previous time points, and the correctable value is obtained according to a function having a high point from which the function descends to both sides on which the high point no more appears.

14. The method according to claim 13, wherein the correctable value is obtained according to a difference between a target class and an erroneous class of the sample data.

15. The apparatus according to claim 13, wherein the function is a bilateral decreasing function, a quadratic function having a high point, a polynomial function having a high point, or a combination thereof.

16. The method according to claim 13, wherein when at least one of some of the sample data generated under most of the at least one the hypothesis is totally correct or erroneous, the correctable value which is small is provided; for other sample data, the correctable value which is large is provided.

17. The method according to claim 13, wherein the diversity is calculated from a contingency table.

18. The method according to claim 17, wherein the contingency table has binary classification.

19. The method according to claim 17, wherein the contingency table has multi-class classification.

20. The method according to claim 17, wherein the sample weight of each sample of the sample data is different.

21. The method according to claim 13, wherein the correctable value is calculated according to the sample weight and the first prediction result of the sample data observed at a previous time point and the actual result.

22. The method according to claim 13, wherein for the adaptive ensemble weight, a larger weight is assigned to the sample data observed at a time point closer to a current time point and a smaller weight is assigned to the sample data observed at a time point farther away from the current time point.

23. The method according to claim 13, wherein the adaptive ensemble weight is stored in a data medium.

24. The method according to claim 13, wherein a product is obtained by multiplying the loss by the correctable value for each sample of the sample data, a sum is obtained by summing up the products for all samples of the sample data, another product is obtained by multiplying the diversity by a regularization parameter, and the ensemble weight obtained via the object function is obtained by subtracting the another product by the sum.

25. A non-transitory computer-readable storage medium used in a computer program product comprising a plurality of instructions allocated to a computing device executing the method as claimed in claim 13.

* * * * *